US007071817B2

(12) United States Patent
Haselsteiner et al.

(10) Patent No.: US 7,071,817 B2
(45) Date of Patent: Jul. 4, 2006

(54) METHOD AND SECURITY APPARATUS FOR VALIDATING AN AUTHORIZATION FOR LOCKING AND UNLOCKING AND/OR USING AN OBJECT

(75) Inventors: Mario Haselsteiner, Haibühl (DE); Klaus Hofbeck, Neumarkt (DE); Thomas Klement, Regensburg (DE); Birgit Rösel, Regensburg (DE); Arnd Stielow, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 168 days.

(21) Appl. No.: 10/772,538

(22) Filed: Feb. 5, 2004

(65) Prior Publication Data
US 2004/0178883 A1 Sep. 16, 2004

(30) Foreign Application Priority Data
Feb. 13, 2003 (DE) .............................. 103 06 023

(51) Int. Cl.
*B60R 25/10* (2006.01)
(52) U.S. Cl. .............................. 340/426.28; 340/5.72; 340/5.64; 340/5.61
(58) Field of Classification Search ........... 340/426.28, 340/5.72, 5.61, 10.1, 5.64
See application file for complete search history.

(56) References Cited

U.S. PATENT DOCUMENTS
6,208,239 B1 * 3/2001 Muller et al. .......... 340/426.35

FOREIGN PATENT DOCUMENTS
DE     199 12 319 C1    10/2000
DE     199 57 536 A1    6/2001
DE     100 64 141 A1    7/2002

* cited by examiner

*Primary Examiner*—Daniel Wu
*Assistant Examiner*—Travis R. Hunnings
(74) *Attorney, Agent, or Firm*—Baker Botts L.L.P.

(57) ABSTRACT

Taking as a starting point known security apparatuses and their methods for distance-dependent initiation of functions in or at an object, the reliability of distance measurements is essentially increased by carrying out a series of distance measurements, an associated quality value (G) being calculated by a mathematical function in each case for the measuring results (M1–M5, R1, R2) of said distance measurements. Only those measured values which fall below a certain quality value (Krit) as a threshold value are generally accepted for an analysis in respect of initiating a distance-related function. Developments provide for selecting measured values beforehand with reference to a level measurement, in order to further increase the reliability, or applying methods of statistical analysis subsequently.

20 Claims, 7 Drawing Sheets

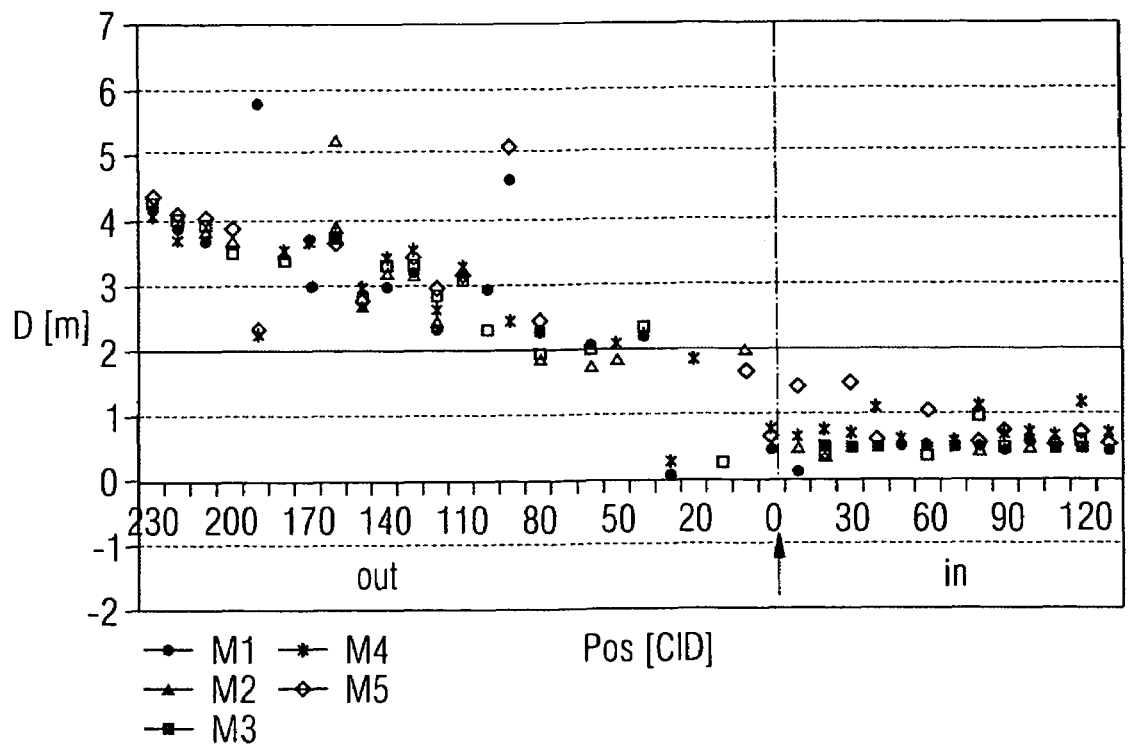
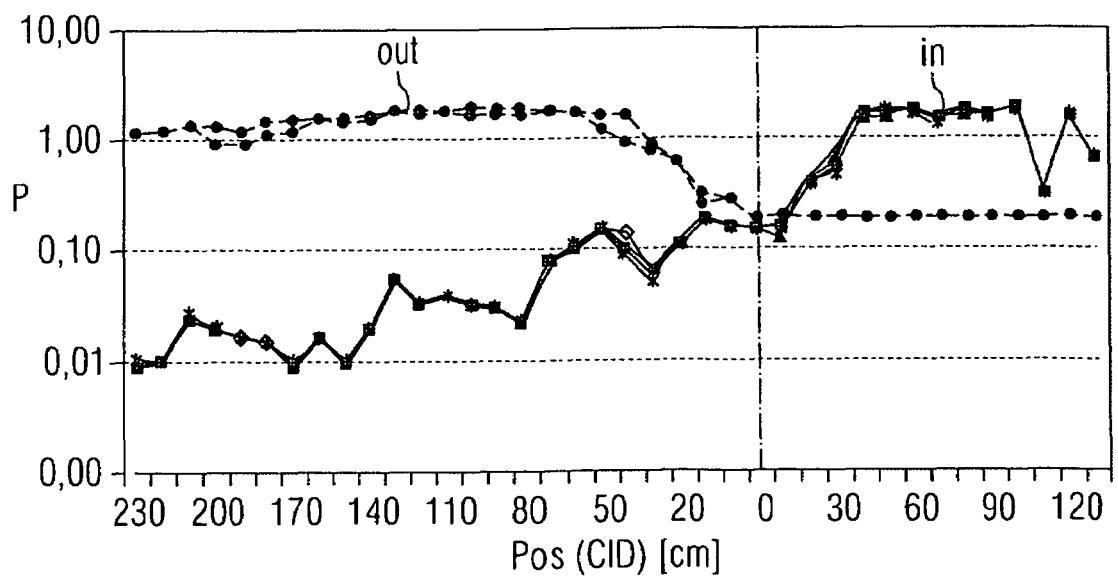

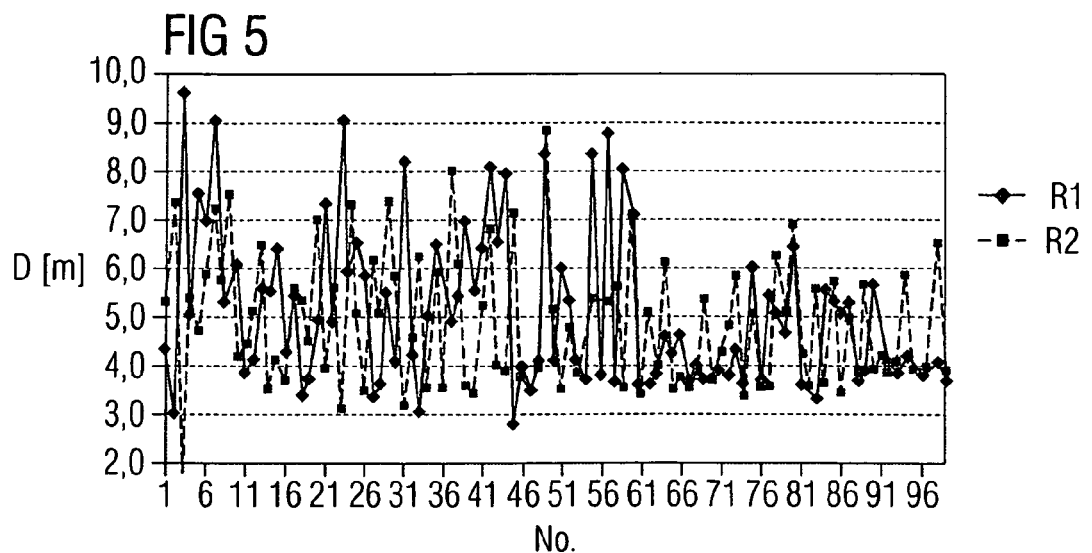
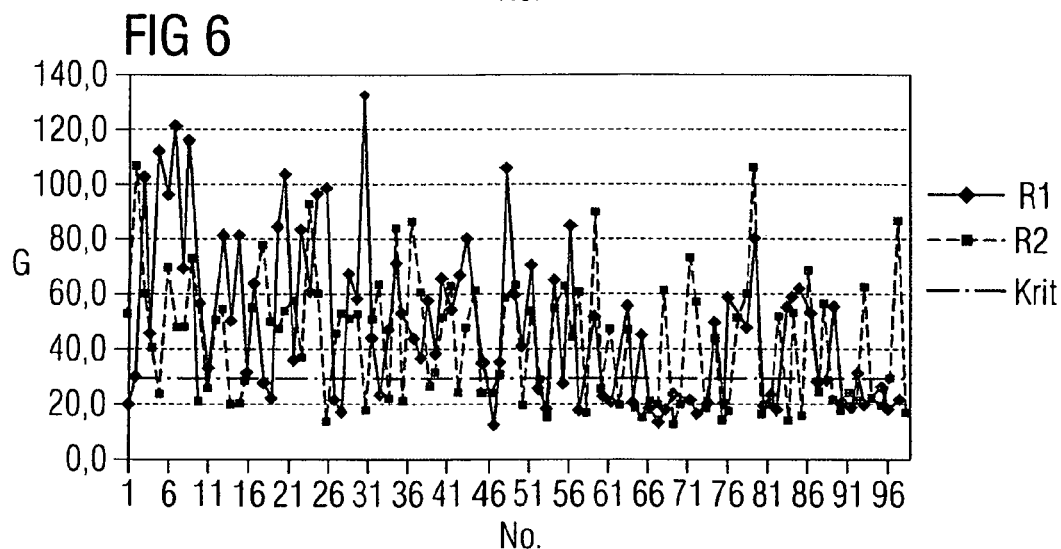
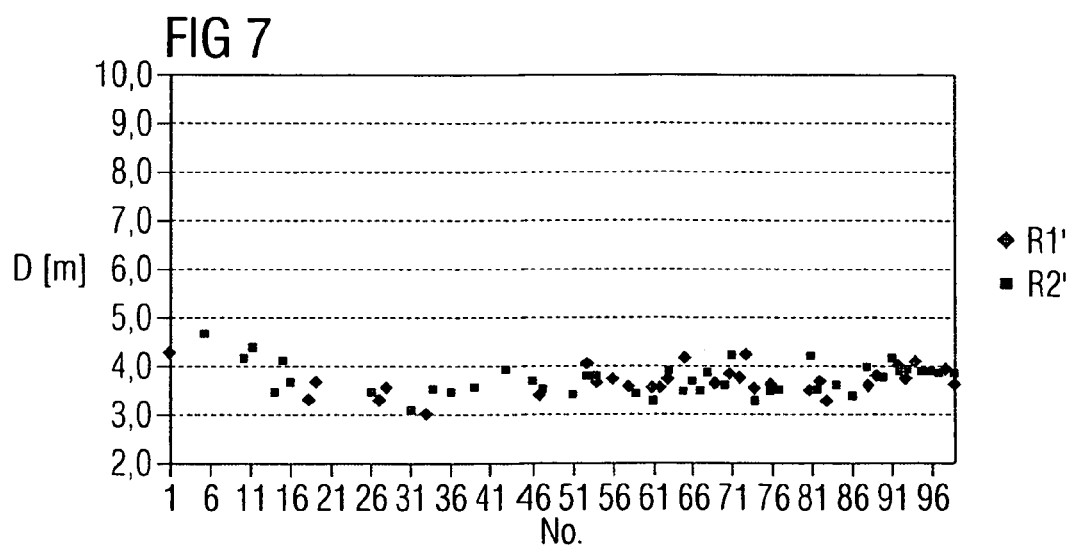

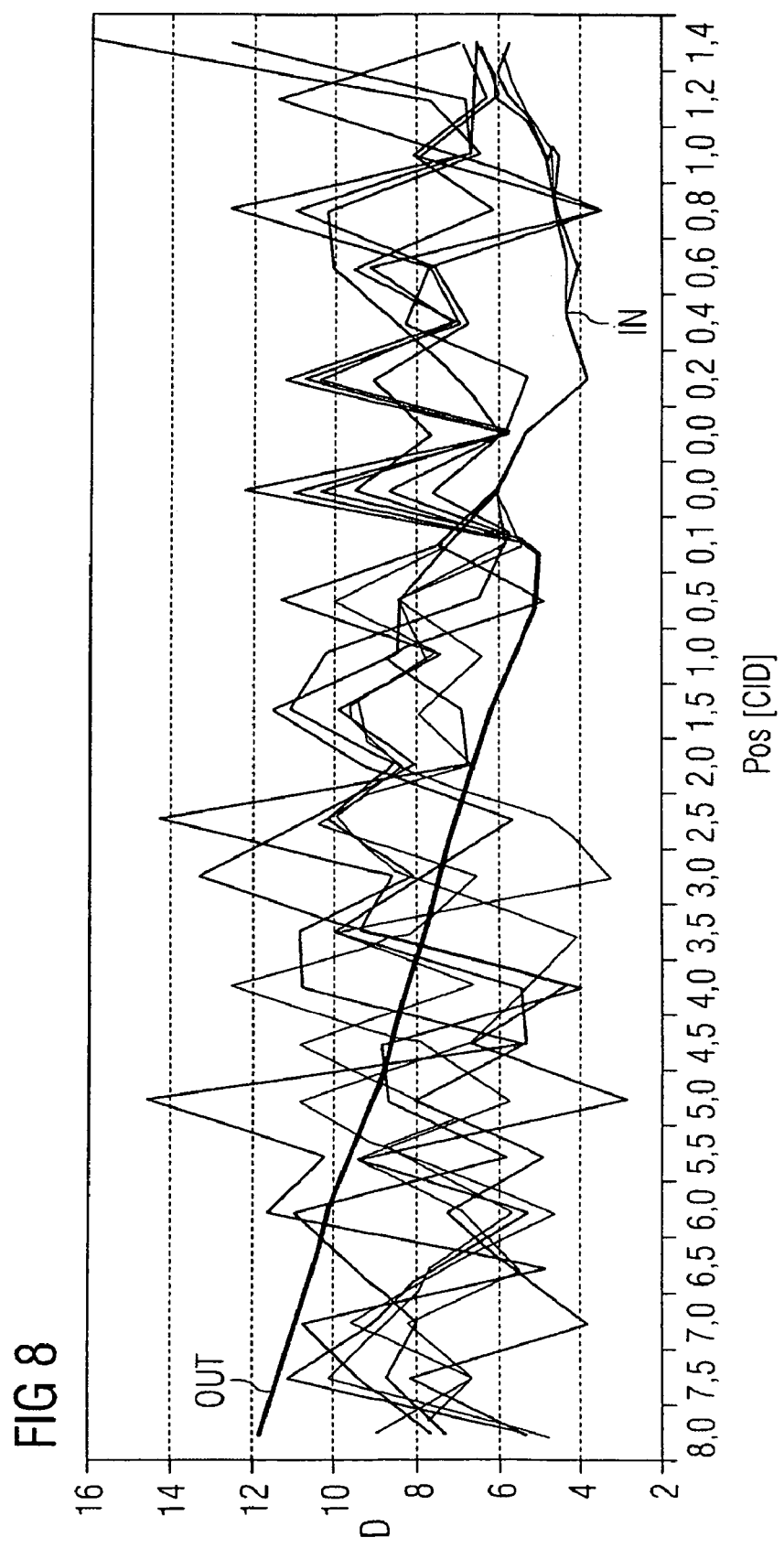

METHOD AND SECURITY APPARATUS FOR VALIDATING AN AUTHORIZATION FOR LOCKING AND UNLOCKING AND/OR USING AN OBJECT

CROSS REFERENCE TO RELATED APPLICATION

This application claims priority to German application no. 103 06 023.5 filed Feb. 13, 2003.

TECHNICAL FIELD OF THE INVENTION

The present invention relates to a method for validating an authorization for locking and unlocking and/or using an object, such as a motor vehicle in particular and a security apparatus.

DESCRIPTION OF THE RELATED ART

A method of this type is disclosed in the German patent document DE 199 12 319 C1, for example. In a security apparatus in accordance with the teaching of the cited patent document, a control device is arranged in the object, said control device being connected to a transmit and receive unit. When initiated by the control device, the transmit and receive unit sends out a request signal. If a portable code generator receives this request signal, it in turn sends back a reply signal, which is received by the transmit and receive unit then analyzed by the control device. As part of this analysis, an authorization of a person carrying the relevant code generator is checked, an example of said authorization being to open the doors of a relevant motor vehicle. Furthermore, if an authorization is present and confirmed, the control device activates at least one locking control means in the object or motor vehicle, depending on a relevant distance of the code generator from the object or motor vehicle and depending on a location in a relevant detection zone around the object or motor vehicle.

Furthermore, as described in the German patent document DE 100 64 141.5 A1, following a confirmation of authority or authorization, further different control commands are initiated by means of the control device by an authorized user, the intention being to increase the convenience of use, depending on a relevant position of the code generator in relation to the object.

A common feature of both of the above methods cited by way of example, and the apparatuses required for implementing said methods, is that they are based on a very reliable determination of a relevant distance of the code generator from the object concerned. Reference is made to the disclosure in DE 199 57 536 A1, for example, for determining the distance in the case of theft-protection systems. In this case, none of the methods known to a person skilled in the art for measuring distance is free of measurement errors or even erroneous measurements of a distance when used under practical environmental conditions. Admittedly, it is generally known from the prior art that, upon receipt of a reply signal responding to a request signal from the transmit and receive unit of the object, the control device sends out request signals at relatively short time intervals in order to improve the communication to the code generator and/or to improve the position-fixing. As a result of the increased transmit and receive activity of the system described above, a large amount of data is recorded for a distance measurement, wherein the distance values that are established as results in each case do not necessarily have to be convergent series, as suggested above with reference to generally known error sources in distance measurement methods of this type.

SUMMARY OF THE INVENTION

The present invention therefore addresses the problem of developing a method and a security apparatus of the type cited above, and thereby improving the reliability of a relevant distance measurement.

This problem can be solved by a method for validating an authorization for locking and unlocking and/or using an object such as in particular a motor vehicle, comprising the steps of:
sending out a request signal by at least one transmit and receive unit at the initiation of a control device, and
if a moving and in particular portable code generator receives this request signal, sending back a reply signal,
analyzing said reply signal being by the control device following receipt in the transmit and receive unit, and
if an authorization is present and confirmed, outputting by the control device at least one control command in the object or motor vehicle, depending on a relevant distance of the code generator from the object or motor vehicle and depending on a location in a relevant detection zone around the object or motor vehicle,
carrying out a series of distance measurements,
calculating an associated quality value by a mathematical function in each case for the measuring results of said distance measurements, wherein only those measured values which fall below a certain quality value as a threshold value are generally accepted for an analysis in respect of initiating a distance-related function.

The object can also be achieved by a security system for validating an authorization for locking and unlocking and/or using an object such as in particular a motor vehicle, comprising a control unit arranged in said object, at least one transmit and receive unit arranged in said object and coupled with the control unit, a mobile code generator, wherein said control unit can trigger said at least one transmit and receive unit to send out a request signal, and wherein the control unit comprises authentication means to authenticate a reply signal sent from said code generator, distance measurement means to determine a distance of said code generator and said transmit and receive unit, and calculating means for determining an associated quality value by a mathematical function in each case for the measuring results of said distance measurements, wherein only those measured values which fall below a certain quality value as a threshold value are generally accepted for an analysis in respect of initiating a distance-related function.

The object can also be achieved by a security apparatus for validating an authorization for locking and unlocking and/or using an object such as in particular a motor vehicle, comprising a control device and a memory arranged in the object, said control device being connected to at least one transmit and receive unit, wherein the transmit and receive unit is operable to transmit a request signal to a remote code generator when initiated by the control device, wherein the control device is further operable to calculate a distance of the code generator to the respective transmit and receive unit and operable to determine an authorization, wherein if an authorization is present and confirmed depending on a relevant distance of the code generator from the object or motor vehicle and depending on a location in a relevant detection zone around the object or motor vehicle, at least the control device is operable to output a control command in the object or motor vehicle, wherein the apparatus comprises means to analyze a reply signal from the code generator, and means to calculate an associated quality value by a mathematical function in each case for the measuring results of said distance measurements, wherein only those measured values which fall below a certain quality value as a threshold value are generally accepted for an analysis in respect of initiating a distance-related function and wherein adjustment parameters and threshold values for the quality criterion and/or a level are permanently stored in the memory of the security apparatus.

A large amount of data can be recorded for a distance measurement, said data being approximated by a straight line, wherein an algorithm in accordance with the method of smallest error squares is used for estimating the parameters of said straight line, and in particular points with greater deviation from the mean value are restrictively weighted by a factor Sigma, and the quality measure is the robust estimate of Sigma. The quality value can be predetermined as a selection criterion and can be itself selected depending on a distance and/or a position of a relevant code generator relative to the object. At least one threshold for such a quality examination can be specified from a relevant distance, position and/or area of a code generator relative to the object or motor vehicle. A level measurement for each individual measured value can be carried out in combination with the method for a quality definition. A level measurement and a selection of measured values of the quality definition can be carried out beforehand, said selection being based on a limit value. An analysis of mean value and scattering and an elimination of "outliers" can be performed in order further to increase the reliability of the distance definition. The range of variation can be reduced further using known mathematical methods of adaptation and statistics. A KALMAN filter technique can be applied to the distance measurements. The additional hardware which is required in relation to known systems can be essentially included in the control device.

In order to obtain a more reliable distance measurement, a series of distance measurements are taken in accordance with the invention, and an associated quality value is calculated in each case for the measuring results by a mathematical function. In an embodiment of the invention, which is described in detail below with reference to the drawing, a high amount of a relevant quality value indicates a rather unreliable distance value, while a low amount of the quality value suggests a high reliability of the distance value concerned. Therefore, in accordance with the invention, only those measured values which fall below a certain quality value are generally accepted for analysis in respect of initiating a distance-related function. This quality value is predetermined as a selection criterion and, in accordance with an essential development of the present invention, is itself dependent on a distance and/or position of a relevant code generator relative to the object. One or more thresholds for such a quality examination can be specified advantageously from a relevant distance and/or position of a code generator relative to the object or motor vehicle. Such a specification is advantageously carried out within the context of the design, and a calibration of a security apparatus in accordance with the invention is carried out and permanently stored in the apparatus, preferably in the control device.

In order further to increase the reliability of the distance measured values which are determined, the method described above for quality definition is carried out in combination with a level measurement for each individual measured value of a distance and, in particular, the level measurement precedes the quality definition. If the measured voltage level of an individual measured value is present, it is first established whether the measured level exceeds a physically conditional minimal value. If this is not the case, then this value cannot be used to define a distance with sufficient reliability.

If a required minimum level for a measured value is available, it is accepted for further examinations. In this way, a selected series of measurements which have a required minimum signal level are finally derived from a relatively large number of consecutively received measured values. A series of measured values is subsequently selected from this series by means of a mathematical function as described above, wherein none of said measured values exceeds a maximum permissible quality value. A range of variation shown by these selected measurements is now clearly smaller than would be shown by the overall series of measurements. This is subsequently illustrated and explained in detail with reference to a preferred exemplary embodiment of the present invention. On the basis of a correspondingly high number of measurements, a reliable picture is now produced of a relevant distance of the code generator from the object, which distance can also be used for deriving a movement of the code generator relative to the object, in order to carry out a reliable and error-free initiation of distance-dependent functions at the object.

In addition to the selection of measuring results from a level-assessed series of measurements as described above, the quality values of said measuring results being below a predetermined relevant minimum value, known mathematical methods of adaptation and statistics can be used to reduce further the range of variation of the measuring results.

BRIEF DESCRIPTION OF THE DRAWINGS

In order to illustrate further features and advantages of an arrangement in accordance with the invention, for implementing a method as described above, the present invention is explained below in greater detail with reference to a preferred exemplary embodiment and with reference to the attached drawing, in which:

FIG. 3 shows an illustration of all measuring results from FIG. 1 whose quality value in each case is less than a quality criterion of G=30 as per FIG. 2, wherein these measuring results are plotted over the relevant assigned actual distance values;

FIG. 4 shows an illustration of the level of the external unit and an internal unit of the motor vehicle in a similar format to FIGS. 1–3;

FIG. 5 shows an illustration of two series of measurements in a diagram as a distance in meters over a number of a relevant measurement;

FIG. 6 shows an illustration of the quality values belonging to the values in FIG. 5 in a similar format;

FIG. 7 shows a diagrammatic illustration, in similar format to the two preceding figures, of the distance values for both series of measurements selected from FIG. 1 in accordance with a selected value criteria G;

FIG. 8 shows a diagrammatic illustration of a plurality of series of measurements over a distance which is measured by an external unit and an internal unit in each case, said distance being plotted over an actual distance of the code generator CID;

DETAILED DESCRIPTION OF THE PREFERRED EMBODIMENTS

A known method for validating an authorization for locking or unlocking and/or using an object is described in greater detail below with reference to an example of a security apparatus which is implemented in a motor vehicle 1 and prevents unauthorized access or prevents unauthorized use, with reference to the picture in FIG. 11. A security apparatus which comprises a control device S and in this instance four transmit and receive units $SE_i$, $SE_1$ to $SE_3$ is provided in the motor vehicle 1. The control device S controls the four transmit and receive units $SE_i$, $SE_1$ to $SE_3$ for sending a request signal and receives a reply signal if a code generator is in the vicinity and can be reached by the request signal, as indicated by the double arrows between the control device S and the transmit and receive units $SE_i$, $SE_1$ to $SE_3$.

The transmit and receive units $SE_1$ to $SE_3$ cover three essentially different near-field sectors A1' to A1''' on lateral sides and a trunk area of the motor vehicle 1. A position area A2 and finally an outer area A3 are added at greater distance around the motor vehicle 1. Depending on a relevant distance, the control device S assigns a defined function to each of the specified position areas.

In a quiescent state, the apparatus sends out request signals at intervals, the frequency of said signals being greatly increased if a reply signal is received. If a person now moves along a broken line marked in the picture in FIG. 11 in the direction of an arrow Pf towards a driver's door of the motor vehicle 1, the control device S must reliably differentiate between a position $C_2$ and a position $C_1$ of a code generator, with reference to a relevant distance d1, d2, via the transmit and receive unit $SE_1$ on the basis of a large number of measured values so that, on the basis of a function which has already been executed and which belongs to the position area A2, the function of the position area A1' for increasing the convenience of use of the motor vehicle 1 can also now be reliably executed in the position $C_1$ by the control device S. Reference is hereby made to the whole of the disclosure of DE 100 64 141.5 for the possible functionality and advantages of securing a motor vehicle 1 against theft etc.

Figure 1:
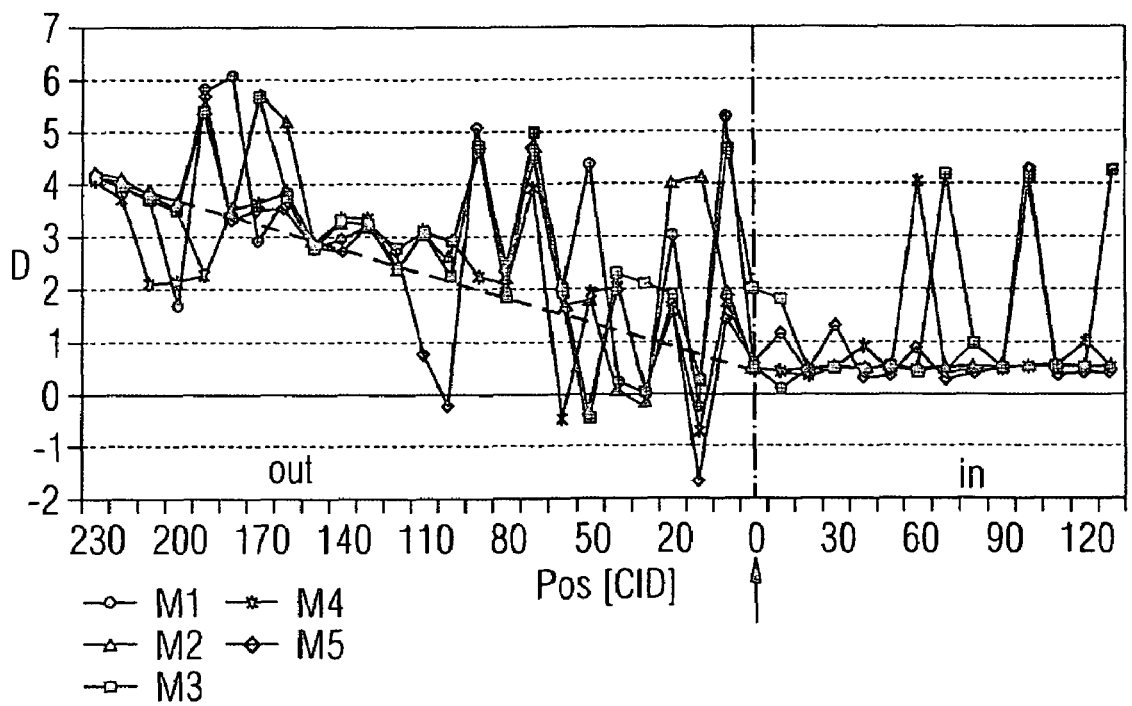
FIG. 1 shows distance measuring results for five series of measurements of a transmit and receive unit which is located on the exterior of the motor vehicle or external unit, when approaching the vehicle from a distance of 230 cm and moving to the interior of the vehicle on a line which runs parallel with the ground and through the center of the car window in the driver's door.

In the illustration in FIG. 1, results of a distance measurement which was carried out in accordance with the prior art by a transmit and receive unit $SE_1$, arranged on the exterior of the motor vehicle 1 or external unit are plotted as a diagram in the form of five series of measurements. In the illustrated measurements, a code generator at a distance of 230 cm from the vehicle 1 was moved up to the external unit $SE_1$. As shown in the picture in FIG. 11, a straight-line movement of the code generator was selected, wherein the approach and movement of the code generator up to the vehicle 1 and into the interior of the vehicle 1 follows a line which runs parallel with the ground and through the center of the car window of a driver's door which is not illustrated in further detail.

Figure 11:
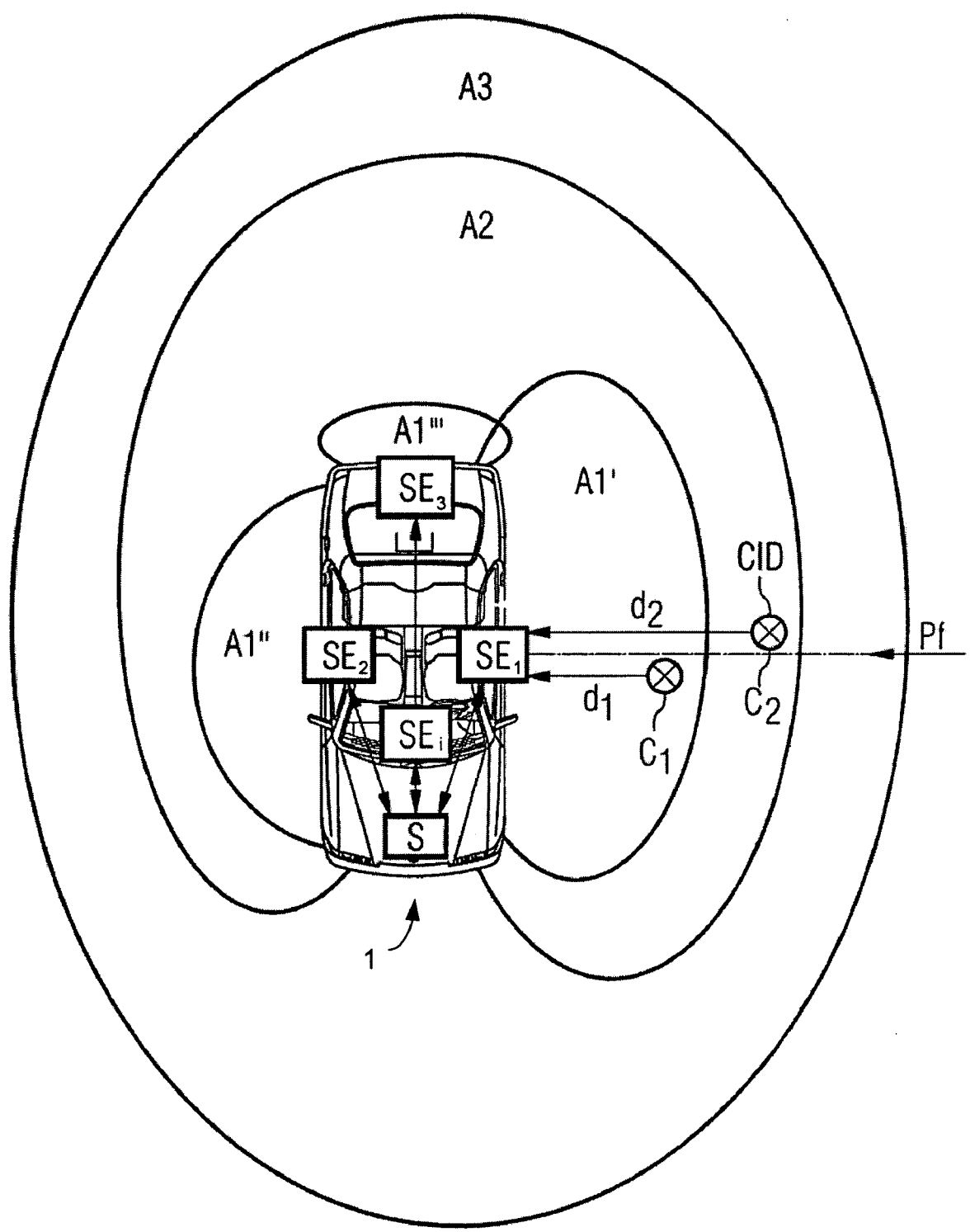
FIG. 11 shows a schematic diagram of a motor vehicle having a security apparatus in accordance with DE 100 64 141.5 A1 for initiating control commands in a motor vehicle depending on a relevant area and on a distance.

Taking as a starting point the zone model of the GHz PASE or "Passive Start and Entry" system disclosed in DE 100 64 141.5 as an access control system of the applicant, wherein no additional active action is required in comparison with a known radio remote control, each of the zones illustrated in FIG. 11 is assigned a distance-specific function. In an example assignment, three zones are assumed and extend along the broken marked curve in the direction of the arrow Pf. In this context, the outer zone A3 controls a foreground illumination at the motor vehicle 1, the middle zone A2 activates the interior light, and the inner zone A1' is assigned the actual unlocking of the vehicle. As a result of the distance measurement, the position of the code signal generator is established and then assigned to the corresponding zone, whereupon the corresponding function is initiated by the control device S.

If a code signal generator approaches the motor vehicle, shown at the positions C1 and C2 in this example, it is now expected that these functions are activated or deactivated in the defined sequence once. However, if the distance measurement is characterized by a wide range of variation, the code signal generator can be assigned to an incorrect zone, which would in turn initiate an incorrect function. The foreground illumination is switched on and off, for example, although the code signal generator remains in the outer zone A3 at all times. As a result of reflections and unrecognized errors in the data analysis, however, the measured distances vary immediately by, for example, several meters in the case of a distance of 1.5 m between the transmit and receive unit $SE_1$ and the code signal generator or Customer Identification Device CID which, as a new type of key for a PASE system, must be included for validating an access authorization without the need to press a button on the CID, e.g. for access, starting or locking. This can be seen from the diagram in FIG. 1. This erroneous assignment has a very negative effect on the reliability of the system. A rapid succession of greatly varying measured values results in frequent activation, locking and unlocking, etc., which causes unnecessary wear and a significant decrease in security as well as increased power consumption.

An essential point of departure for the present invention is the recognition that the determined measured values vary significantly in terms of their reliability, and this can also be measured and evaluated by calculation using a mathematical model. A large amount of data is recorded for a distance measurement, and this data is approximated by a straight line. The rise in this straight line is a measure for the distance between the transmit and receive unit $SE_1$ as a base station at the motor vehicle 1 and the code signal generator CID. The available algorithm used for estimating the parameters of this straight line is an algorithm in accordance with the methods of the smallest error squares or MKQ, the principles of which are explained in e.g. Teubner Taschenbuch der Mathematik, Chapter 7.2.4, Ausgleichung und die Methode der kleinsten Quadrate [compensation and the methods of the smallest squares]. However, the weighting is iteratively adapted in the method used here. In the exemplary embodiment presently under consideration, points with greater deviation from the mean value are also restrictively weighted by a factor Sigma in this case. The algorithm is therefore less sensitive to individual "outliers" than with the "normal" methods of the smallest error squares. The quality measure G is the robust estimate of Sigma. In this way, a lower value corresponds to a smaller deviation and vice versa.

Figure 2:
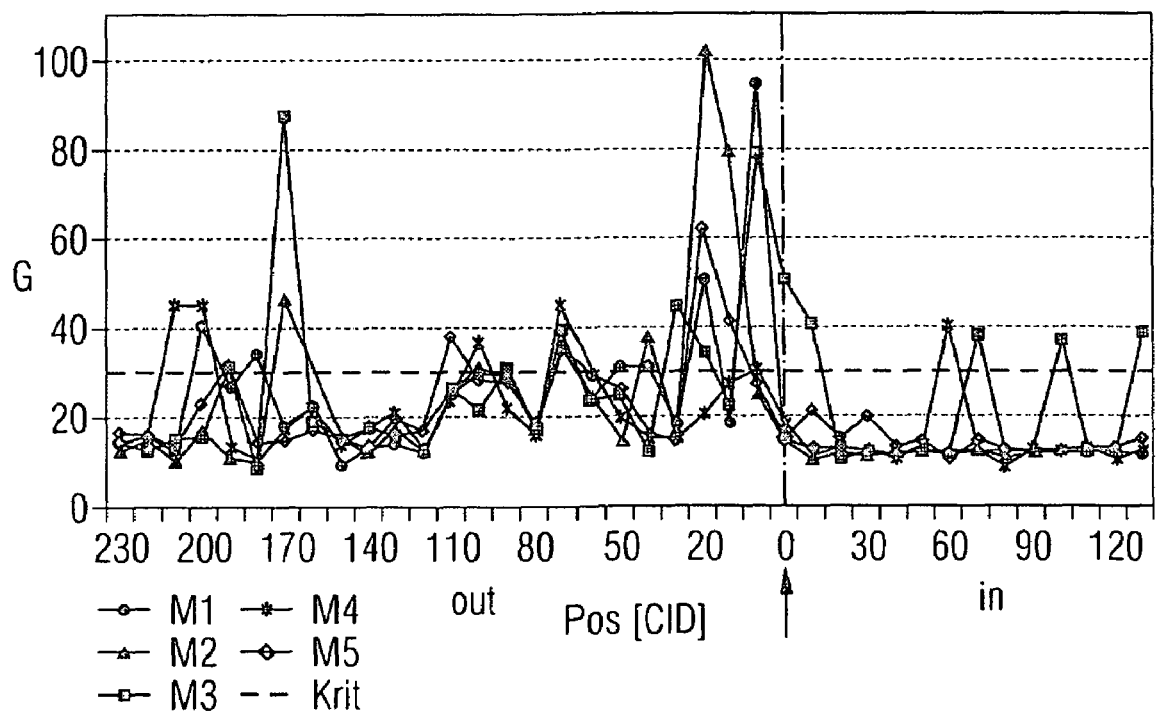
FIG. 2 shows a diagram of the quality values for the measured values as per FIG. 1, when approaching the vehicle in the manner described above.

The diagram in FIG. 2 shows the quality values, relative to the measured values as per FIG. 1 in each case, of the transmit and receive unit $SE_1$ as an external unit as the code signal generator CID approaches the vehicle 1 in the manner described above.

Therefore, in order to obtain a reliable distance measurement as a trigger for the distance-specific initiation of an action, a series of distance measurements is still executed. Using the mathematical function described above, the quality value of each individual measurement is calculated. A high amount of the quality value indicates a rather unreliable distance value, while a low amount of the quality value indicates a high reliability of the distance value. In accordance with the invention, the range of variation of essentially immediately consecutive measured values is reduced to an effective level, by introducing a quality criterion Krit. Accordingly, only those measurements which do not exceed the quality criterion Krit as a maximum permissible quality value, as marked in the picture in FIG. 2 by the horizontally extending broken line for a value 30, are selected for further processing from the series of measurements. The selected measurements now show a clearly narrower range of variation than the complete series of measurements, as shown by the picture in FIG. 3.

In a further embodiment of the invention, the applied method is very advantageously extended by a preceding measuring and examination step: In order to further increase the reliability of the distance measured values which are determined, a level measurement is carried out in addition to the method described above for quality definition and selection of each individual measurement in accordance with a quality criterion. If the measured voltage level P of an individual measured value is present, it is first established whether the measured level P exceeds a physically conditional minimal value. If this is not the case, then this value cannot be used to define a distance with sufficient reliability.

The closer the code generator CID to the transmit and receive unit $SE_1$, the closer the signal. Therefore the determined level P will also be better. In accordance with this simple observation, a further tightening of the selection criterion for the level examination is introduced: A plurality of thresholds are provided for such a level examination, said thresholds being specified by a relevant distance and/or position of a code generator CID relative to the motor vehicle 1. This specification takes place for each zone A1 to A3 in this context, wherein during the design and a calibration of a security apparatus in accordance with the invention, corresponding measurements and tests for respecting actual occurring phenomena of screening and/or constructive and destructive interference are carried out and permanently stored within the apparatus in the memory of the control device S.

FIG. 4 shows a corresponding illustration of the levels P of the external unit $SE_1$ and an internal unit $SE_i$ of the motor vehicle 1 in an illustration which is similar to the FIGS. 1–3. As a result of the preceding evaluation steps, very clear curve shapes emerge even for 5 families of measured values, said curve shapes also allowing a clear distinction between values OUT of the external unit $SE_1$ and values IN of the internal unit $SE_i$. If the measured distances are corrected in the described manner during an approach of the identification generator CID, a monotonic decreasing sequence of distance values is produced during a smooth approach to the vehicle 1. Practical measurements have shown that this sequence can now be recognized even under poor measuring conditions. Said sequence can then be used in conjunction with further criteria such as the shape of the level at the internal and external station as a criterion for distinguishing between internal and external space. Therefore a distinction between external and internal space is also made on this basis, additionally providing clearly distinguishable values for differentiating the position Pos of the code generator CID in the vicinity of the car window of the driver's door as a narrow barrier between external space and internal space. The extreme relevance to security of a distinction between external and internal space is sufficiently known to a person skilled in the art, inter alia from the publications cited above, and therefore the high value of the present, very reliable results is not described in further detail.

This exemplary embodiment as per the invention therefore ensures overall that individual distance measuring results are selected from the series of measurements in such a way that the distance can be defined with a narrow range of variation. In a similar manner to the FIGS. 1 to 3, two further series of measurements are illustrated as further examples in the FIGS. 5 to 7. Given a minimum quality Krit=30, a clear reduction from 3–10 m to 3.1–4.4 m is achieved here in the range of variation. Given a minimum quality Krit of 18, the range of variation is reduced to 3.3–4.3 m.

Figure 9:
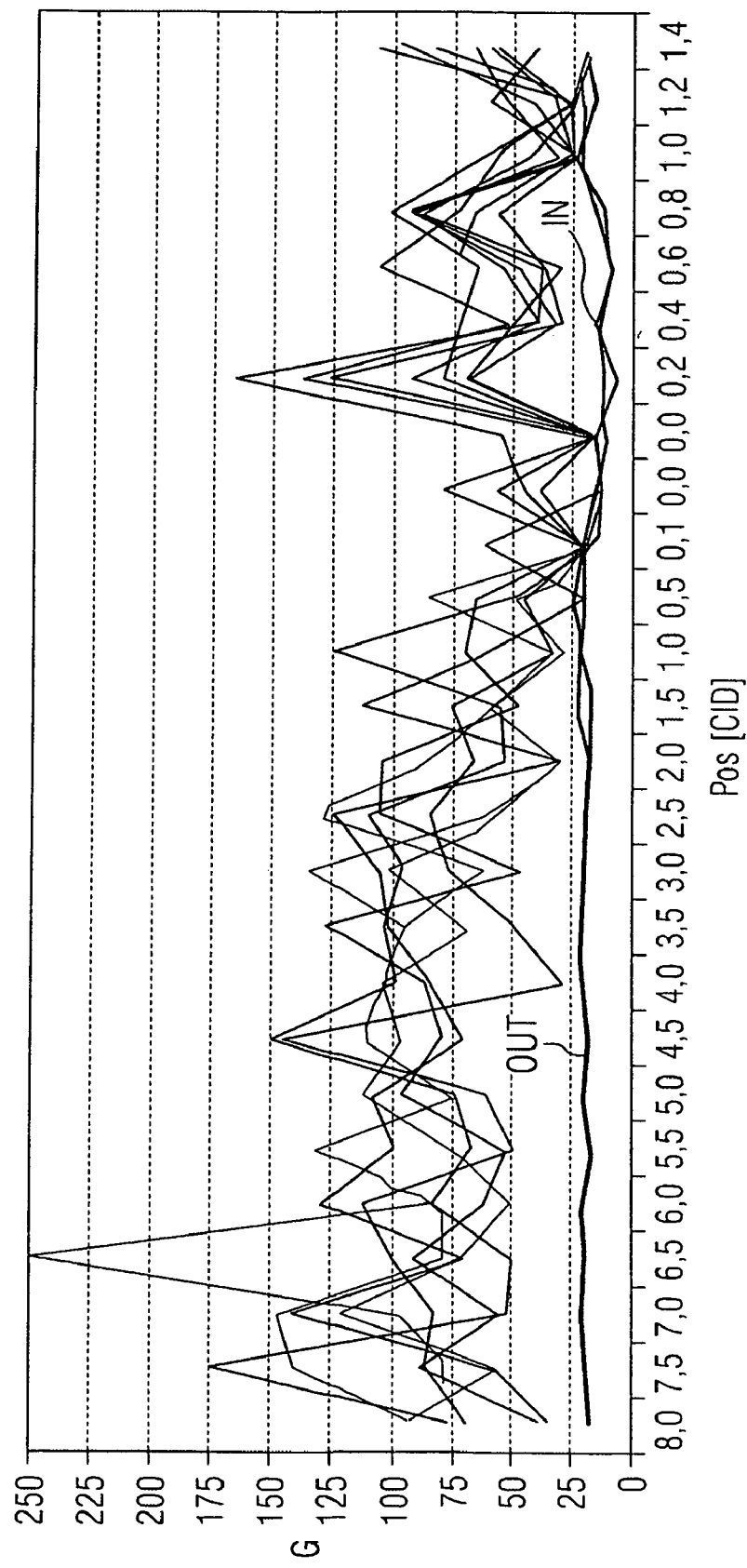
FIG. 9 shows an illustration of the quality values belonging to the series of measurements from FIG. 8, divided into the values of the external unit and the internal unit in each case.
Figure 10:
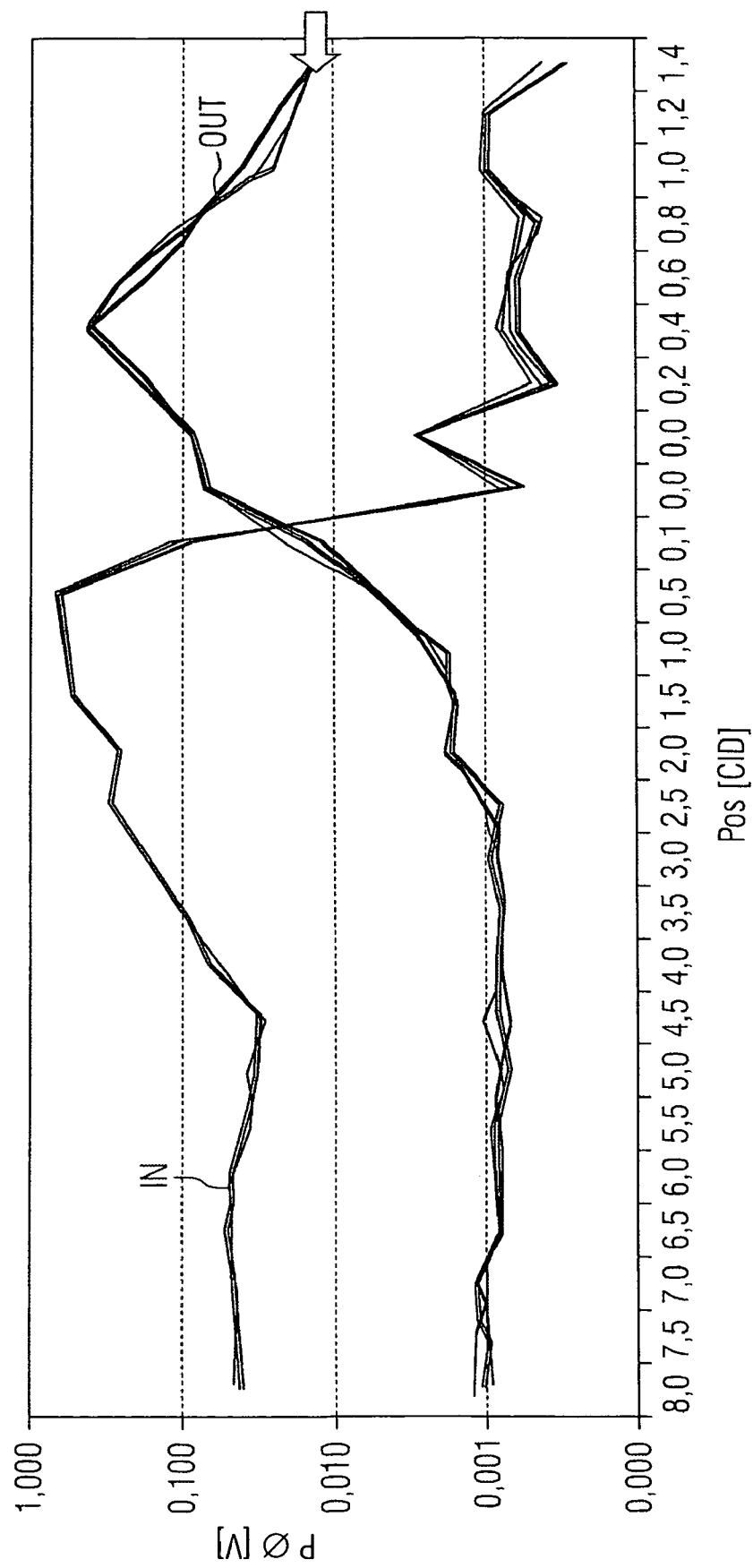
FIG. 10 shows a diagrammatic illustration, in similar format to the two preceding figures, of an average absolute level of the series of measurements from the external unit and the internal unit.

Finally, with reference to the pictures in FIGS. 8 to 10, diagrammatic illustrations are used to clarify a plurality of series of measurements over a distance which is measured by an external unit and an internal unit in each case, plotted over an actual distance of the code generator CID. A diagrammatic illustration of the quality values belonging to the series of measurements in FIG. 8, divided into the values of the external unit and the internal unit in each case, and the illustration of an average absolute level P with a clear level interval, as identified by a double arrow, of the series of measurements from the external unit and the internal unit, emphasize the clearly improved meaningfulness of the series of measurements concerned which has been achieved using the method in accordance with the invention.

On the basis of the distance measuring results selected thus, known mathematical statistical methods can be used to define even more reliably a distance at which the code signal generator is situated. For example, in embodiments of the invention which are not further illustrated, an analysis of mean value and scattering is performed, as well as an elimination of "outliers". The range of variation is also further narrowed using known mathematical methods of adaptation and statistics. A simple example is the averaging of individual distance measurements; it is more resource-intensive and more effective to apply the KALMAN filter technique to the distance measurements, cf. e.g. M. S. Grewal, A. P. Andrews—Kalman Filtering—Theory and Practice using Matlab and R. G. Brown, P. Y. C. Hwang—Introduction to Random Signals and Applied Kalman Filtering.

In another embodiment of the invention which is not further illustrated, various quality criteria are specified on the basis of a relevant distance and position of a code generator CID relative to the motor vehicle 1 or the transmit and receive units $SE_i$, $SE_1$ to $SE_3$. It is also possible to adaptively reduce the minimum quality which must not be reached. In this way, even under unfavorable measuring conditions, it is possible to achieve a narrower range of variation and therefore greater reliability of the distance measurement.

The foregoing therefore presents a security apparatus for implementing a method in accordance with the invention, wherein said security apparatus can also be retrospectively installed in existing systems and can be advantageously adapted in a scalable manner to provide an accuracy and reliability of distance measurements by adding further analysis and evaluation stages for relevant requirements of an application area. In this case, the costs of additional hardware are essentially limited to the control device S, which is however already provided for as a component in known security apparatuses. A retrospective installation can therefore take the form of a replacement of an electronic component.

The invention claimed is:

1. A method for validating an authorization for locking and unlocking and/or using an object, comprising the steps of:
  sending out a request signal by at least one transmit and receive unit at the initiation of a control device, and
  if a moving and in particular portable code generator receives this request signal, sending back a reply signal,
  analyzing said reply signal being by the control device following receipt in the transmit and receive unit, and
  if an authorization is present and confirmed, outputting by the control device at least one control command in the object or motor vehicle, depending on a relevant distance of the code generator from the object or motor vehicle and depending on a location in a relevant detection zone around the object or motor vehicle,
  carrying out a series of distance measurements,
  calculating an associated quality value by a mathematical function in each case for the measuring results of said distance measurements, wherein only those measured values which fall below a certain quality value as a threshold value are accepted for an analysis in respect of initiating a distance-related function.

2. The method as claimed in claim 1, wherein a plurality of data is recorded for a distance measurement, said data being approximated by a straight line, wherein an algorithm in accordance with the method of smallest error squares is used for estimating the parameters of said straight line, and in particular points with greater deviation from the mean value are restrictively weighted by a factor Sigma, and the quality measure is the robust estimate of Sigma.

3. The method as claimed in claim 1, wherein the quality value is predetermined as a selection criterion and is itself selected depending on a distance and/or a position of a relevant code generator relative to the object.

4. The method as claimed in claim 1, wherein at least one threshold for such a quality examination is specified from a relevant distance, position and/or area of a code generator relative to the object or motor vehicle.

5. The method as claimed in claim 1, wherein a level measurement for each individual measured value is carried out in combination with the method for a quality definition.

6. The method as claimed in claim 1, wherein a level measurement and a selection of measured values of the quality definition are carried out beforehand, said selection being based on a limit value.

7. The method as claimed in claim 1, wherein an analysis of mean value and scattering and an elimination of "outliers" are performed in order further to increase the reliability of the distance definition.

8. The method as claimed in claim 1, wherein a range of variation is reduced further using known mathematical methods of adaptation and statistics.

9. The method as claimed in claim 1, wherein a KALMAN filter technique is applied to the distance measurements.

10. A security apparatus for validating an authorization for locking and unlocking and/or using an object, comprising a control device and a memory arranged in the object, said control device being connected to at least one transmit and receive unit, wherein the transmit and receive unit is operable to transmit a request signal to a remote code generator when initiated by the control device, wherein the control device is further operable to calculate a distance of the code generator to the respective transmit and receive unit and operable to determine an authorization, wherein if an authorization is present and confirmed depending on a relevant distance of the code generator from the object or motor vehicle and depending on a location in a relevant detection zone around the object or motor vehicle, at least the control device is operable to output a control command in the object or motor vehicle, wherein the apparatus comprises means to analyze a reply signal from the code generator, and means to calculate an associated quality value by a mathematical function in each case for the measuring results of said distance measurements, wherein only those measured values which fall below a certain quality value as a threshold value are accepted for an analysis in respect of initiating a distance-related function and wherein adjustment parameters and threshold values for the quality criterion and/or a level are permanently stored in the memory of the security apparatus.

11. The security apparatus as claimed in claim 10, wherein the additional hardware which is required in relation to known systems is included in the control device.

12. A security system for validating an authorization for locking and unlocking and/or using an object, comprising:
  a control unit arranged in said object;
  at least one transmit and receive unit arranged in said object and coupled with the control unit;
  a mobile code generator;
  wherein said control unit can trigger said at least one transmit and receive unit to send out a request signal, and
  wherein the control unit comprises
    authentication means to authenticate a reply signal sent from said code generator,
    distance measurement means to determine a distance of said code generator and said transmit and receive unit, and
    calculating means for determining an associated quality value by a mathematical function in each case for the measuring results of said distance measurements, wherein only those measured values which fall below a certain quality value as a threshold value are accepted for an analysis in respect of initiating a distance-related function.

13. The security system as claimed in claim 12, further comprising a memory coupled with said control unit.

14. The system as claimed in claim 13, wherein adjustment parameters and threshold values for the quality criterion and/or a level are permanently stored in the memory.

15. The security system as claimed in claim 12, wherein said means for measuring the distance record a plurality of data, said data being approximated by a straight line, wherein an algorithm in accordance with the method of smallest error squares is used for estimating the parameters of said straight line, and in particular points with greater deviation from the mean value are restrictively weighted by a factor Sigma, and the quality measure is the robust estimate of Sigma.

16. The security system as claimed in claim 12, wherein the quality value is predetermined as a selection criterion and is itself selected depending on a distance and/or a position of a relevant code generator relative to the object.

17. The security system as claimed in claim 12, wherein at least one threshold for such a quality examination is specified from a relevant distance, position and/or area of a code generator relative to the object or motor vehicle.

18. The security system as claimed in claim 12, wherein a level measurement for each individual measured value is carried out in combination with the method for a quality definition.

19. The security system as claimed in claim 12, wherein a level measurement and a selection of measured values of the quality definition are carried out beforehand, said selection being based on a limit value.

20. The security system as claimed in claim 12, wherein an analysis of mean value and scattering and an elimination of "outliers" are performed in order further to increase the reliability of the distance definition.

* * * * *